United States Patent [19]

Koike

[11] Patent Number: 5,528,364
[45] Date of Patent: Jun. 18, 1996

[54] HIGH RESOLUTION EUV MONOCHROMATOR/SPECTROMETER

[75] Inventor: Masako Koike, Moraga, Calif.

[73] Assignee: The Regents, University of California, Oakland, Calif.

[21] Appl. No.: 277,404

[22] Filed: Jul. 19, 1994

[51] Int. Cl.⁶ ..................................................... G01J 3/18
[52] U.S. Cl. ..................... 356/334; 359/575; 250/505.1; 376/84
[58] Field of Search ........................... 250/505.1; 378/84; 359/575; 356/334

[56] References Cited

U.S. PATENT DOCUMENTS

| | | | |
|---|---|---|---|
| 4,886,341 | 12/1989 | Oishi et al. | 359/575 |
| 5,047,650 | 9/1991 | Harada et al. | 250/505.1 |
| 5,078,495 | 1/1992 | Harada et al. | 356/334 |
| 5,274,435 | 12/1993 | Hettrick | 356/334 |

*Primary Examiner*—Jack I. Berman
*Attorney, Agent, or Firm*—Pepi Ross

[57] ABSTRACT

This invention is related to a monochromator which employs a spherical mirror, a traveling plane mirror with simultaneous rotation, and a varied spacing plane grating. The divergent beam from the entrance slit is converged by the spherical mirror located at the various positions in the monochromator depending of the inventive system. To provide the meaningful diffraction efficiencies and to reduce unwanted higher order lights, the deviation angle subtending the incidence and diffraction beams for the plane grating is varied with the position of the traveling plane mirror with simultaneous rotation located in the front or back of the plane grating with wavelength scanning. The outgoing beam from the monochromator goes through the fixed exit slit and has same beam direction regardless of the scanning wavelength. The combination of properly designed motions of the plane mirror and novel varied-spacing parameters of the inventive plane grating corrects the aberrations and focuses the monochromatic spectral image on the exit slit, enabling measurements at high spectral resolution.

19 Claims, 7 Drawing Sheets

HIGH RESOLUTION EUV MONOCHROMATOR/SPECTROMETER

BACKGROUND OF THE INVENTION

This invention was made with U.S. Government support under Contract No. DE-AC03-76SF00098 between the U.S. Department of Energy and the University of California for the operation of Lawrence Berkeley Laboratory. The U. S. Government may have certain rights in this invention.

The typical monochromators dedicated to the synchrotron radiation working on the extreme ultraviolet region give the resolving power, $\lambda/\Delta\lambda$, of $10^2$–$10^4$. However, since most experiments require a $\lambda/\Delta\lambda$ of $10^3$–$10^5$, it is clear that the radiation does not possess a bandwidth narrow enough to meet most experimental requirements for monochromatic radiation. The efforts have been made to improve the resolving power of the monochromators by introducing varied spacing gratings, aspherical mirrors, and various mounting and scanning schemes. However, the problem is not addressed satisfactory.

1. Field of the Invention

This invention relates generally to high resolution spectrometer optics. More specifically the invention relates to a novel optical system for monochromators. Additionally the invention relates to diffraction gratings used in monochromators and spectrometers.

2. Description of Related Art

Experiments utilizing synchrotron radiation (SR) in the wavelength region from about 0.5 nm to about 10 nm often require a high resolution, high flux, high purity grazing incidence monochromator. For this, various types of objective (i.e., slitless) monochromators have been designed in recent years: the SX-700 monochromator and its modified versions, a self-focusing plane-grating monochromator, and a Monk-Gillieson type monocrhromator, are some examples.

These designs provide medium resolutions (about 2,000 to about 10,000) and take certain measures for attaining high flux and high spectral purity. However, when used on a undulator beamline at low-emittance SR facility such as the Advanced Light Source (ALS) at Lawrence Berkeley Laboratory, the resolution of the existing monochrometers does not increase in inverse proportion to the source size. This is due to imperfections in aspheric surface finish and/or the residual aberrations in the individual monochromators.

SUMMARY OF THE INVENTION

The present invention was designed minimize aberrations resulting from imperfection in the spherical mirror. It was designed using a hybrid method based on both ray-tracing and analytic methods. It compensates for changing focal plane of different wavelengths with a traveling rotating plane mirror and compensates for aberrations resulting from the spherical mirror with a novel inventive diffraction grating. The inventive optical system provides a high-resolution grazing incidence plane grating monochromator with resolving power of up to 70,000 in the 0.5 nm to 10 nm range. It is particularly useful can be used on an undulator beam line, inserted in the low emittance synchrotron stage ring. The inventive optical system employs a spherical mirror, a traveling and simultaneously rotating plane mirror, and a novel varied-groove-spacing plane grating. It is particularly useful in monochromators. The divergent beam from the entrance slit is converged by the spherical mirror located at the various positions in the monochromator depending of the configuration chosen. To provide meaningful diffraction efficiencies and to reduce unwanted higher order light, the deviation angle subtending the incidence and diffraction beams for the plane grating is varied with the position of the traveling plane mirror. The mirror is rotated simultaneously with the rotation of the plane grating's wavelength scanning motion. The outgoing beam from the monochromator goes through the fixed exit slit and has same beam direction regardless of the scanning wavelength. The combination of properly designed motions of the plane mirror to focus the monochromatic spectral image on the exit slit and varied-spacing grooves of the plane grating (G) corrects aberrations and enables monochromator measurements at high spectral resolution.

SUMMARY DESCRIPTION OF THE DRAWINGS

FIG. 1: is a schematic plan view of the inventive grating used in a monochromator.

FIG. 2: is a schematic plan view of a second configuration of the inventive grating used in a monochromator.

FIG. 3: is a schematic plan view of a third configuration of the inventive grating used in a monochromator.

FIG. 4: is a schematic plan view of a forth configuration of the inventive grating used in a monochromator.

FIG. 5: shows spot diagrams calculated by ray tracing on a computer model of the configuration shown in FIG. 1.

FIG. 6: shows spot diagrams calculated by ray tracing on a computer model of the configuration shown in FIG. 2.

FIG. 7: shows the resolving powers achievable for the configurations shown in FIGS. 1, 2, and 3.

FIG. 8: Schematic diagram of the undulator beamline optics.

FIG. 9: Spot diagrams and line profiles constructed for the designed monochromator.

FIG. 10: Estimated resolving power of the monochromator. Curves I and II are estimated from spot diagrams with different definitions of $\Delta\lambda$ (see text), and III is for the source-size limited case.

DETAILED DESCRIPTION OF THE INVENTION

Figure 1:
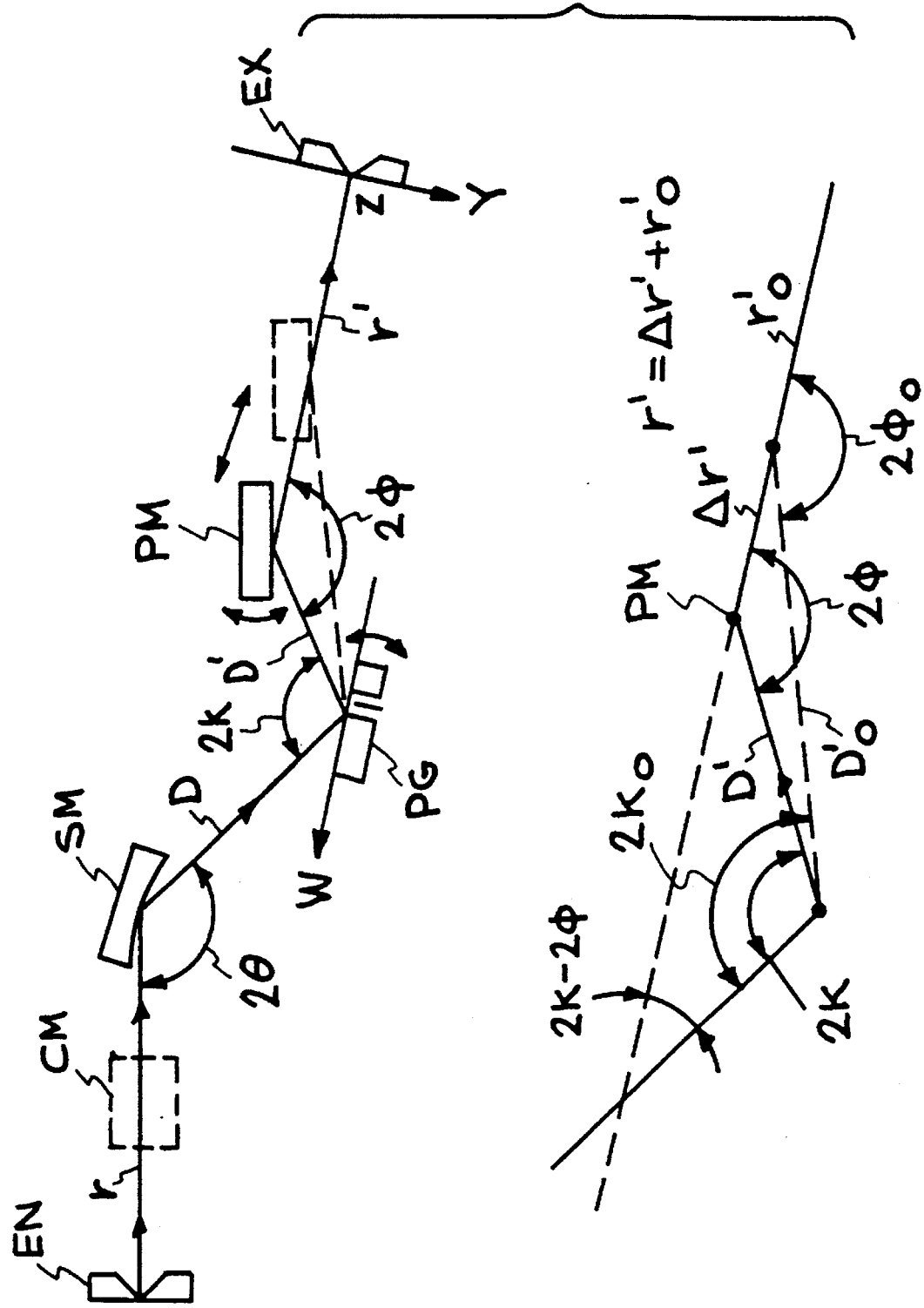

The present invention comprises an optical system utilizing an inventive diffraction grating for use in a spectrometer or monochromator. The diffraction grating comprises a reflecting surface having a plurality of substantially straight, parallel grooves of varying spacing from one another, said groove spacing being approximately determined by a formula $d_n = d_0 + 2an + 6bn^2 + 4cn^3$, where $d_n$ is the approximate spacing between the nth groove and the (n+1) groove and wherein the coefficients (also referred to as ruling parameters) $2a$, $6b$, and $4c$ are determined from the resolving power, $\mathcal{R}$, for a specific optical configuration. Varying the groove spacing according to the above formula decreases optical aberrations and increases resolving power of the optical system by a factor of about 7 to about 30 for wavelengths between about 0.5 nm and about 10 nm. Combining the inventive diffraction grating with a moving mirror element provides an optical system where the focal length of the system can be varied and optimized so that each desired wavelength is focused at the exit plane of the optical system.

The following abbreviations are used in the text and in the drawings:

EN: entrance slit or light source,
US: undulator source,
CM: optional concave mirror for the correction of the astigmatism,
SM: spherical mirror
PG: varied spacing plane grating,
PM: plane mirror,
EX: exit slit, or exit plane.

Referring to FIG. 1, the centers of the entrance slit EN, spherical mirror SM, traveling plane mirror with simultaneous rotation PM, grating PG, and exit slit EX lie in one and the same vertical plane which will be referred to as the vertical plane. A spherical mirror SM accepts the beam from the entrance slit EN at an angle of incidence $\theta$ and produces a vertically converging beam incident onto a varied spacing plane grating PG. Vertically diffracted light of wavelength $\lambda$ is focused on the exit slit EX and can also be focused horizontally if an optional concave mirror CM is inserted. Wavelength scanning is carried out by grating rotation about the central groove while mirror PM is traveling on the normal to the exit slit and rotating. Therefore the deviation angle 2K of the grating is vary with the scanning wavelength.

As the role of the plane mirror PM is merely to transmit the diffracted rays to the exit slit at an angle $\phi$, the system is considered as a double-element system consisting of the mirror SM and the grating PG. Thus, the design of this monochromator is determined by the ruling parameters of the grating, the total distance PG to PM and PM to EX=D'+r' and the deviation angle 2K for given values of the wavelength scanning range $\lambda_{min}$–$\lambda_{max}$, grating constant d, spectral order m, radius of curvature R of SM, distance EN-to-SM=r, distance SM-to-PG=D, and angles $\theta$ and K–$\phi$.

The ruling parameters $d_0$, $2a$, $6b$, and $4c$ are related to the spacing $d_n$ between the nth groove and (n+1)th groove through $$d_n = d_0 + 2an = 6bn^2 = 4cn^3 \qquad (1)$$

where $d = d_0 - a + b$ is the effective grating constant that satisfies the grating equation. Equation (1) is also expressed in a power series of the coordinates (w, l) of a point on the nth groove:

$$nd = w + n_{20}w^2/2 + n_{30}w^3/2 + n_{40}w^4/8 + \ldots \qquad (2)$$

where $$n_{20} = -J,\ n_{30} = J^2 - K,\ n_{40} = 10JK - 5J^3 - (8c/d^4),\ J = 2(a - 3b + c)/d^2,\ K = 4(b - c)/d^3 \qquad (3)$$

The design parameters are optimized by minimizing a merit function Q which is closely related to the variance of an infinite number of ray-traced spots in the image plane. Detailed analysis of a double-element system shows that the coordinates (Y,Z) of the image point formed in the plane of the exit slit by a ray originating from a point on the entrance slit having a height z and diffracted at a point P(w, l) on the grating can be expressed in a power series of $w^i l^j z^k$ as $$Y = wf_{100} + w^2 f_{200} + l^2 f_{020} + lz f_{011} + z^2 f_{002} + w^3 f_{300} + wl^2 f_{120} + wlz f_{111} + wz^2 f_{102} + \ldots, \qquad (4)$$

$$Z = zg_{001} + lg_{010} + wlg_{110} + wzg_{101} + w^2 lg_{210} + w^2 zg_{201} + l^3 g_{030} + l^2 zg_{021} + lz^2 g_{012} + \ldots, \qquad (5)$$

The $f_{ijk}$'s and $g_{ijk}$'s can be determined by analytically or utilizing a numerical method used in lens designs.

Once the coefficients $f_{ijk}$'s and $g_{ijk}$'s are known, the merit function Q is then given by $$Q = 1/N \sum_n Q(\lambda_n) = 1/N \sum_{n^1} [q_Y^2(\lambda_n) + \mu q_Z^2(\lambda_n)] \qquad (6)$$

$$= \sum_{n^2} C_f^2 \left[ \frac{1}{WLH} \int_{-W/2}^{W/2} \int_{-L/2}^{L/2} \int_{-H/2}^{H/2} (Y - \bar{Y})^2\, dwdldz + \frac{\mu}{WLH} \int_{-W/2}^{W/2} \int_{-L/2}^{L/2} \int_{-H/2}^{H/2} Z^2\, dwdldz \right],$$

where $$\bar{Y} = \frac{1}{WLH} \int_{-W/2}^{W/2} \int_{-L/2}^{L/2} \int_{-H/2}^{H/2} Y\, dwdldz. \qquad (7)$$

In Eqs. (6) and (7), $C_f$, N, $\mu$, W, L, and H are the reciprocal linear dispersion at $\lambda$, the wavelength number, the weighting factor, ruled width, groove length, and source (effective entrance slit) height, respectively. Note here that Y and Z are functions of wavelength. The design parameters are optimized by means of the damped least squares method with the Q as its merit function. For the numerical method, the $f_{ijk}$'s and $g_{ijk}$'s needed to calculate Q are determined in the following manner:

(1) Generate 9 rays of wavelength $\lambda_n$ randomly.
(2) Trace these rays through the system, source point on EN-SM-PG-PM-EX, and determine a set of values $[w(p,\lambda_n), l(p,\lambda_n), z(p,\lambda_n), Y(p,\lambda_n), Z(p,\lambda_n)]$ for the pth ray of $\lambda_n$, p being 1, 2, ..., 9.
(3) Determine the $f_{ijk}$'s and $g_{ijk}$'s for the $\lambda_n$ by solving the simultaneous equations resulting from substitution of the nine sets of values obtained in step (2) into Eqs. (4) and (5), respectively.
(4) Repeat steps (1) through (3) for other design wavelengths chosen.

In designing the monochromator, we assumed $\lambda_{min}$=0.5 nm, $\lambda_{max}$=10 nm, m=1, d=1/2400 mm, W=100 mm, L=50 mm, H=1 mm, R=155.7 m, r=18 m, D=200 mm, $\theta$=88, and K–$\phi$=–1°. Also $K_0$=88, $\phi_0$=89, and $D_0$=400 mm for $\lambda_{min}$, and K=–80.5° for $\lambda_{max}$. The distances D' and r', and angles $\phi_0$ and $\phi$ needed to fulfill the requirements of the fixed exit slit are now expressed as $$D' = \frac{\sin 2\phi_o}{\sin 2\phi} D_0', \qquad (8)$$

$$\Delta r' = \frac{\sin 2(\phi_o - \phi)}{\sin 2\phi} D_0',\ r' = r_0' + \Delta r'.$$

TABLE I

| Wavelength (nm) | K. (°) | φ (°) | D' (mm) | r' (mm) | D' + r' (mm) |
|---|---|---|---|---|---|
| 5 | 87.995 | 88.995 | 398.179 | 1648.484 | 2046.663 |
| 25 | 85.494 | 86.494 | 114.350 | 1934.225 | 2048.575 |
| 50 | 83.486 | 84.486 | 72.977 | 1976.282 | 2049.258 |
| 75 | 82.049 | 83.049 | 58.100 | 1991.582 | 2049.682 |
| 100 | 80.497 | 81.497 | 47.729 | 2002.580 | 2050.310 |

Figure 2:
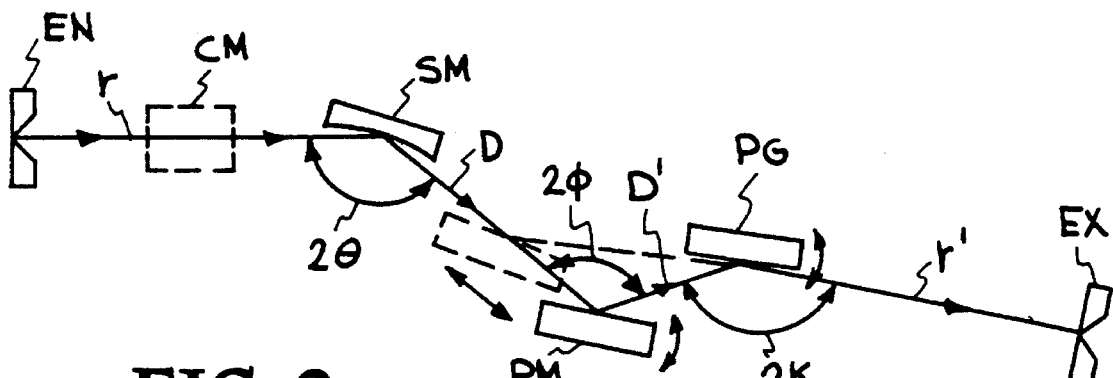

The design parameters determined with $\lambda_n$'s=0.5, 2.5, 5.0, 7.5, and 10.0 nm are $2a=1.762906\times10^{-10}$ mm, $6b=5.299280\times10^{-17}$ mm, $4c=1.354672\times10^{-23}$ mm, $[n_{20}=-1.015434\times10^{-3}$ mm$^{-1}$, $n_{30}=5.427238\times10^{-7}$ mm$^{-2}$, $n_{40}=-1.17480\times10^{-9}$ mm$^{-3}]$. The wavelength dependent parameters K, φ, D', and r' are listed in Table I An alternative embodiment of the invention is schematically shown in FIG. 2. A spherical mirror SM accepts the beam from the entrance slit EN at an angle of incidence and produces a vertically converging beam incident onto a varied spacing plane grating PG via the reflection with a traveling plane mirror with simultaneous rotation PM. Vertically diffracted light of wavelength λ is focused on the exit slit EX and can also be focused horizontally if an optional concave mirror CM is inserted. Wavelength scanning is carried out by grating rotation about the central groove while mirror PM is traveling on the direction of the reflected beam from the spherical mirror SM and rotating. Therefore the deviation angle 2K of the grating varies with the scanning wavelength. Because the only function of the plane mirror PM is to direct the beam to the grating, the system is considered as a double-element system consisting of the mirror SM and the grating PG. Thus, the design of this monochromator is determined by the ruling parameters of the grating, the total distance SM-to-PM-to-PG=D+D+ distance PG-to-EX=r' and the deviation angle 2K for given values of the wavelength scanning range $\lambda_{min}$–$\lambda_{max}$, grating constant d, spectral order m, radius of curvature R of SM, distance EN-to-SM=r, and angles θ and K–φ.

In designing the monochromator, we assumed $\lambda_{min}$=0.5 nm, $\lambda_{max}$ =10 nm, m=1, d=½₄₀₀ mm, W=100 mm, L=50 mm, H=1 mm, R=160.0 m, r=18 m, e=88, and K–f=–1. Also K=88 for $\lambda_{min}$ and 80.5 for $\lambda_{max}$ are assumed.

Employing the same method as the case of FIG. 1, the design parameters determined with $\lambda_n$'s=0.5, 2.5, 5.0, 7.5, and 10.0 nm are $2a=1.848019\times10^{-10}$ mm, $6b=5.810809\times10^{-17}$ mm, $4c=-4.631731\times10^{-23}$ mm, $[n_{20}=-1.0644586\times10^{-3}$ mm$^{-1}$, $n_{30}=5.975474\times10^{-7}$ mm$^{-2}$, $n_{40}=2.743292\times10^{-9}$ mm$^{-3}]$, and r'=1952.626 mm. The wavelength dependent parameters K, f, D, and D' are listed in Table II.

TABLE II

| Wavelength (nm) | K. (°) | φ (°) | D (mm) | D' (mm) | D + D' (mm) |
|---|---|---|---|---|---|
| 5 | 88.000 | 89.000 | 152.910 | 347.090 | 500.000 |
| 25 | 85.493 | 86.493 | 220.836 | 279.776 | 500.612 |
| 50 | 83.478 | 84.478 | 282.825 | 218.283 | 501.108 |
| 75 | 81.927 | 82.927 | 329.105 | 172.383 | 501.488 |
| 100 | 80.500 | 81.500 | 377.504 | 124.339 | 501.843 |

Figure 3:
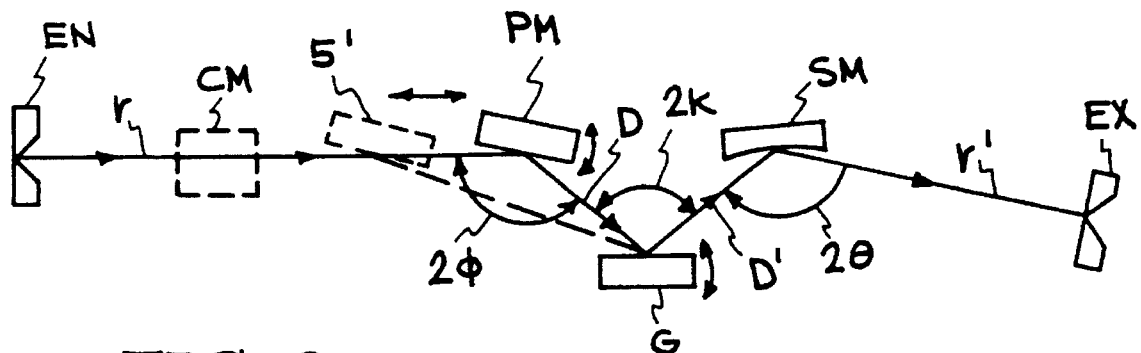

A third embodiment of the invention is schematically shown in FIG. 3. A traveling plane mirror PM with simultaneous rotation accepts the beam from the entrance slit EN at an angle of incidence φ and directs a vertically diverging beam incident onto a varied spacing plane grating. PG. Vertically diffracted light of wavelength is reflected with a spherical mirror SM and focused on the exit slit EX and can also be focused horizontally there if an optional concave mirror CM is inserted. Wavelength scanning is carried out by grating rotation about the central groove while mirror PM is traveling on the normal to the entrance slit EN and rotating. Therefore the deviation angle 2K of the grating varies with the scanning wavelength. Because the only function of the plane mirror PM is to direct the beam to the grating, the system is considered as a double-element system consisting of the mirror SM and the grating PG. Thus, the design of this monochromator is determined by the ruling parameters of the grating, the distance EN-to-PM-to-PG=r+D and the deviation angle 2K for given values of the wavelength scanning range $\lambda_{min}$–$\lambda_{max}$, grating constant d, spectral order m, radius of curvature R of SM, EN-to-PM distance r, PM-PG distance D, and angles and K–φ. Optically this configuration is an equivalent system shown in FIG. 1 wherein the entrance and exit slits are replaced. Therefore, the same design method as the case of FIG. 1 can be applied.

Figure 4:
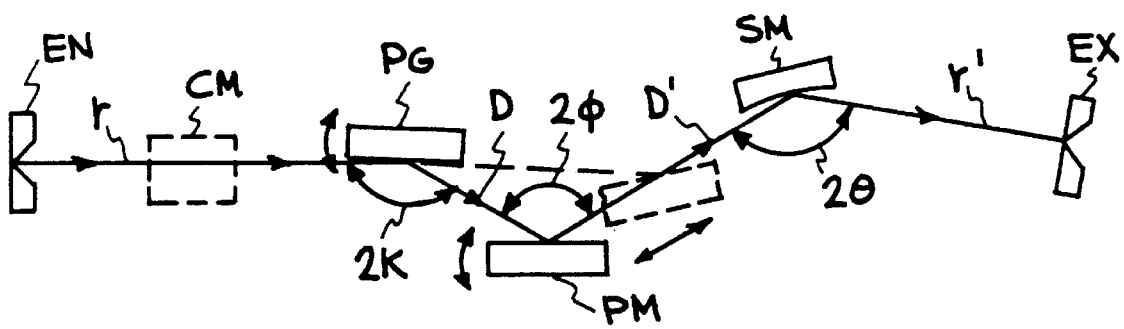

A fourth embodiment of the invention is schematically shown in FIG. 4. A plane grating PG accepts the beam from the entrance slit EN. A traveling plane mirror PM with simultaneous rotation accepts the diffracted light of wavelength λ from PG at an angle of incidence φ and directs a vertically diverging beam incident onto a spherical mirror SM at an angle θ. Vertically convergent light is focused on the exit slit EX and can also be focused horizontally there if an optional concave mirror CM is inserted. Wavelength scanning is carried out by grating rotation about the central groove while mirror PM is traveling on the direction of the reflected beam from SM and rotating. Therefore the deviation angle 2K of the grating is vary with the scanning wavelength. As the role of the plane mirror PM is merely to direct the beam to the grating, the system is considered as a double-element system consisting of the mirror SM and the grating PG. Thus, the design of this monochromator is determined by the ruling parameters of the grating, the distances EN-to-PG=r and PG-to-PM-to-SM=D+D', and the deviation angle 2K for given values of the wavelength scanning range $\lambda_{min}$–$\lambda_{max}$, grating constant d, spectral order m, radius of curvature R of SM, SM-to-EX distance r', and angles θ and K–φ. Optically this configuration is an equivalent system shown in FIG. 2 wherein the entrance and exit slits are replaced.

A particularly desirable feature of the present invention is that the elements comprising the monochromator optics can intercept the electromagnetic radiation in any order. That is, the sequence order may be:

- source, spherical mirror, grating, plane mirror, and exit port; or
- source, spherical mirror, plane mirror, spherical mirror, and exit port; or
- source, plane mirror, grating, spherical mirror, and exit port; or
- source, grating, plane mirror, spherical mirror, and exit port.

All these sequences provide equal results because the inventive grating reduces aberrations from the spherical mirror.

Figure 5:
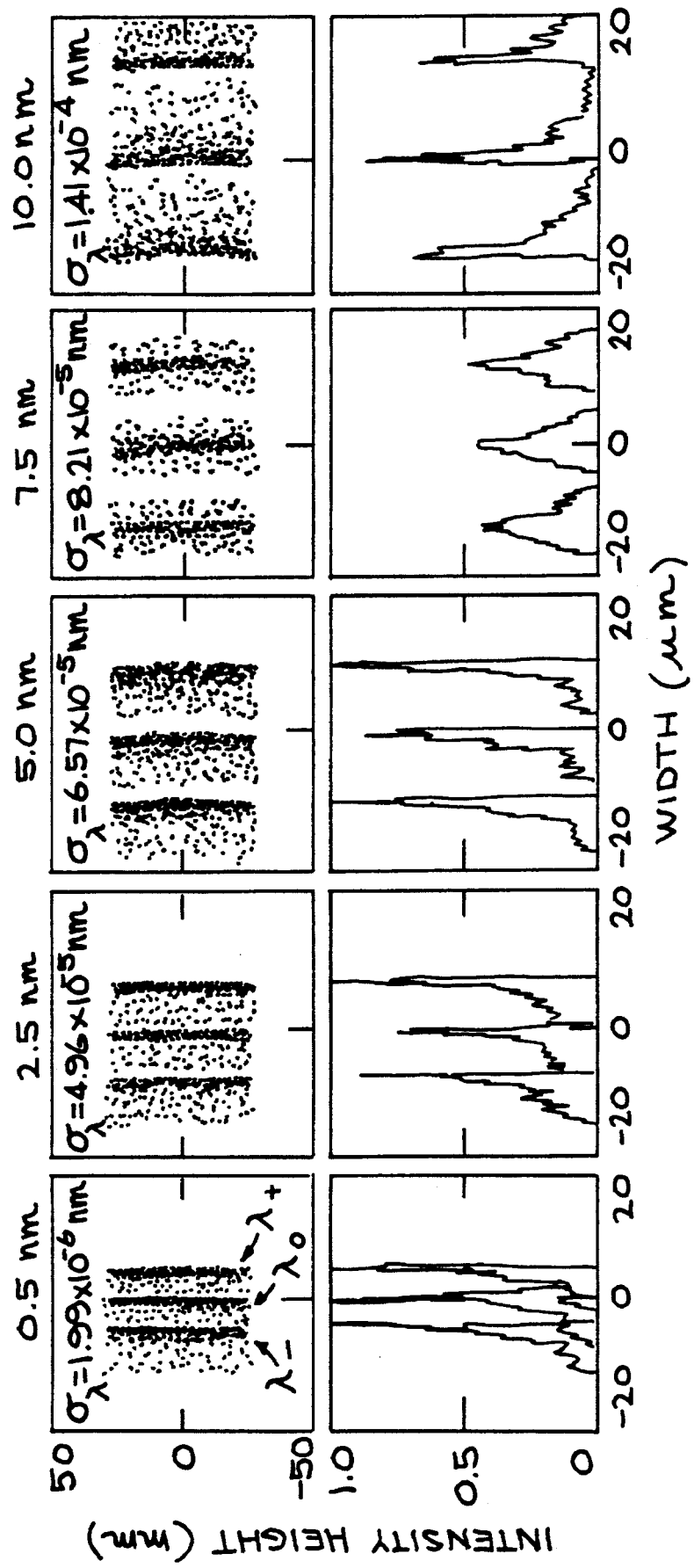
Figure 6:
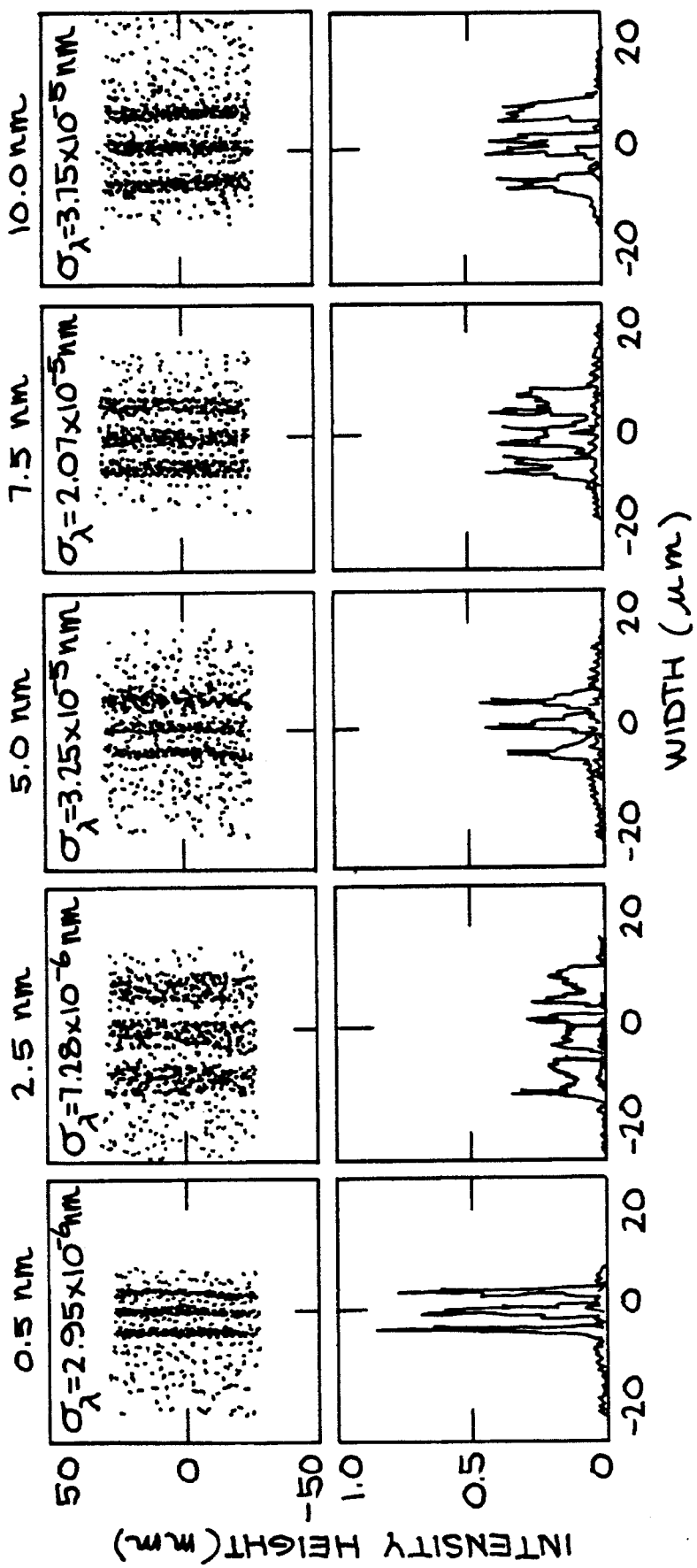

FIG. 5 and FIG. 6 show spot diagrams and line profiles constructed for the monochromator using the parameters shown in Tables 1 and 2, respectively. Each diagram is constructed with 500 randomly generated rays for individual wavelengths of $\lambda_0$ and $\lambda_\pm+\lambda_0\pm(\lambda_0/15,000)$. Also, a grating having W=100 mm and L=50 mm, and a self-luminous source having an infinite width and a height H=1 mm at EN are assumed. The standard deviation $\sigma_\lambda$ of the spots is also given in each graph.

Ray tracing method and analysis is standard practice in the art. The methods used in FIGS. 5 and 6 are discussed in detail in an article, by T. Namioka and M. Koike, Analytical representation of spot diagrams and its application to the design of monochromators, *Nuclear Instruments and Methods in Physics Research A*, 319:219–227 (1992).

Figure 7:
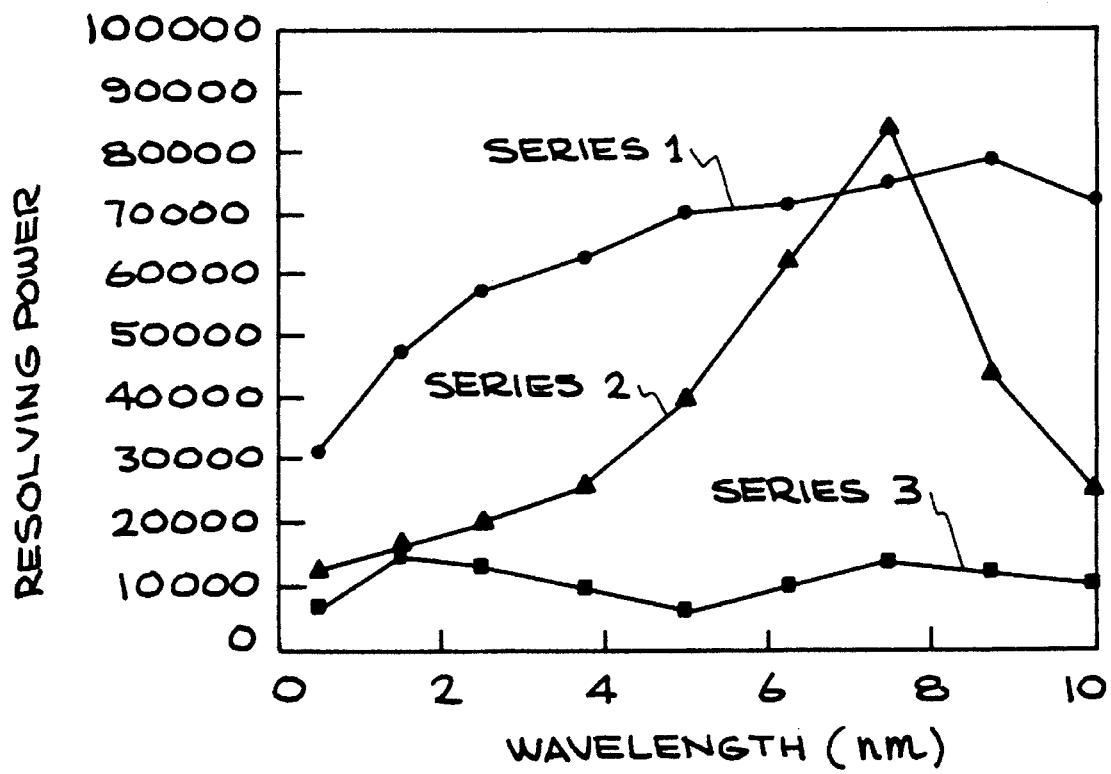

FIG. 7 shows estimated the spectral resolving powers in accordance with the system shown in FIG. 1 and FIG. 2. To simplify the procedure we assumed a Gaussian line profile in the Y direction and defined the spectral resolving power $\mathcal{R}$ as $$\mathcal{R} = \lambda/\Delta\lambda, \quad \Delta\lambda = 2.64 \, \sigma_\lambda \tag{9}$$

This condition is an extension of the Rayleigh criterion that if the height of the valley between two equivalent spectral lines reveals 83% of the peak height of the lines, the two spectral lines are considered to be resolved. Series 1 and 2 are those for the monochromator described in FIG. 1. An undulator source is assumed to be placed at the position of the entrance slit in Series 1 and the a self-luminous source having a infinite width and 10 mm long at the entrance slit is assumed in the Series 2, respectively. Series 3 is that for the monochromator described in FIG. 2, and a self-luminous source having a infinite width and 10 mm long is assumed. From these results expected resolving power are about 30,000 to about 80,000 for Series 1, about 10,000 to about 80,000 for Series 2 (refer to FIG. 5), and about 6,000 to about 16,000 for Series 3 (refer to FIG. 6). In terms of the merit function O, $\mathcal{R} = \lambda/\{2.68[\sigma(\lambda)]^{1/2}\}$.

EXAMPLE OF USE IN THE ADVANCED LIGHT SOURCE SYNCHROTRON RADIATION FACILITY AT LAWRENCE BERKELEY LABORATORY

DESIGN PROCEDURE

Figure 8:
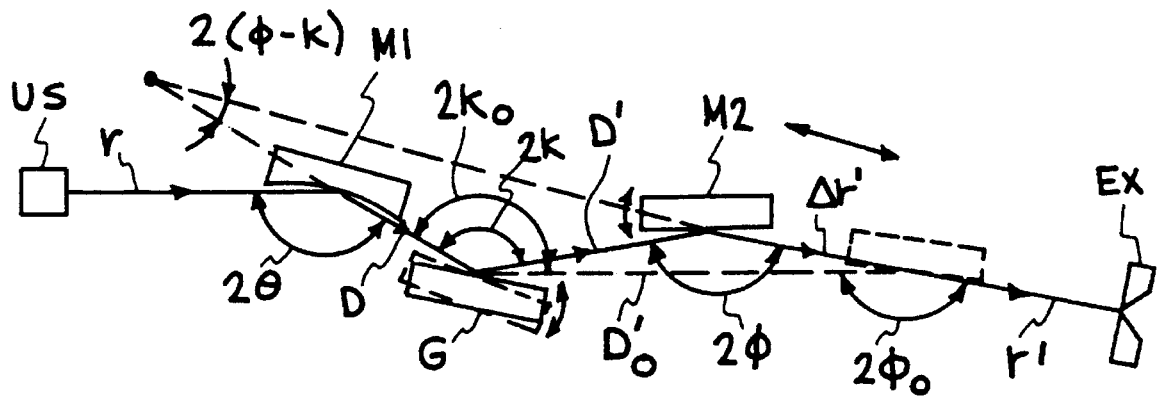

FIG. 8 is a schematic of undulator beamline optics: US, undulator source; M1, fixed spherical mirror (incidence angle θ); G, varied spacing plane grating (incidence angle α, deviation angle 2K); M2, movable plane mirror (incidence angle φ); and EX, fixed exit slit. The ray US-M1-G-M2-EX lies in a vertical plane and represents the principal ray of wavelength λ that passes through the centers of respective optics. Wavelength scanning is carried out by combining simultaneous rotation and translation of M2 with simple rotation of G, while keeping the exiting beam direction unchanged. The principal role of G and M2 here is to improve the on-blaze feature and higher-order suppression by properly varying α, 2K, and φ with scanning. For convenience of design, we define a reference scanning point C for M2: C is taken on the straight line M2EX and specified by the distance G-to-C≡$D_0$' and the angle <M1GC≡$2K_0$ or <GCEX≡$2\phi_0$. The positions of G and M2 at λ are drawn in FIG. 8 by solid lines and those at C by dotted lines.

In order to maximize the resolving power $\mathcal{R}$ of a chosen optical system, the design parameters comprising the ruling parameters ($2a$, $6b$, $4c$) and the scanning parameters (α, K, φ, distances G-to-M2≡D" and M2-to-EX≡r') were optimized. The spacing $d_n$ between the nth and the (n+1)th groove is defined by $$d_n = d + a - b + 2an + 6bn^2 + 4cn^3 \tag{9}$$

where d is the effective grating constant. In order to keep the exiting beam direction fixed during the scan, the scanning parameters (D', r', α, K, φ) at λ and ($D_0$', $r_0$', $\alpha_0$, $K_0$, $\phi_0$) at the reference scanning point C must satisfy $$D' = D'_0 \sin 2\phi_0 / \sin 2\phi, \quad \phi - K = \text{const.} \tag{10}$$

$$\Delta r' \equiv r' - r'_0 = D'_0 \sin 2(\phi_0 - \phi) / \sin 2\phi.$$

The design parameters are optimized for given scanning range $\lambda_{min}$–$\lambda_{max}$, d, spectral order m, distances US-to-M1≡r and M1-to-G ≡D, and θ, while exactly fulfilling Eq. (2) and the focusing condition $$(\cos^2\alpha/\bar{r}) + [\cos^2\beta/(D' + r')] - 2m\lambda[(a - 3b + c)/d^3] = 0 \tag{11}$$

in the vertical plane, where $$d(\sin\alpha + \sin\beta) = m\lambda, \tag{12}$$

$$\bar{r} = D - rR\cos\theta/(2r - R\cos\theta).$$

In Eqs. (3) and (4), β is the angle of diffraction of the principal ray G-M2 of λ in mth order and R is the radius of curvature of M1.

In the design, we employ a hybrid design method given in Ref. 10 below. The method incorporates ray tracing into an analytic merit function[11]

$$Q = \sum_i Q(\lambda_i)$$

whose component $Q(\lambda_i)$ closely represents the variance of the spots formed when an infinite number of rays of a design wavelength $\lambda_i$ are traced through the optical system concerned. In brief, for a given optical geometry, we (1) generate a ray of $\lambda_i$ randomly from US, (2) determine the intersections of the ray with the surface of G and the plane of EX by means of ray tracing, (3) substitute the coordinates of the intersections and those of the source point into the analytic formulas for spot diagrams, Eqs. (4) and (5) of Ref. 10, to obtain a linear equation of nine unknown $f_{ijk}$'s and that of nine unknown $g_{ijk}$'s, (4) repeat steps (1)–(3) for 8 other rays of $\lambda_i$, (5) determine the $f_{ijk}$'s and $g_{ijk}$'s, 9 each, by solving the respective systems of 9 linear equations, and (6) repeat steps (1) through (5) for other design wavelengths. A practical method for choosing just 9 proper rays without causing much statistical dispersion in the resulting $f_{ijk}$'s and $g_{ijk}$'s will be published elsewhere. Finally, Q ($\lambda_i$)'s are calculated by substituting the values of the $f_{ijk}$'s and $g_{ijk}$'s, illuminated width W and height L of the grating, and source size H into Eqs. (6) and (7) of Ref. 11. The design parameters are optimized by minimizing the merit function Q by means of a damped least squares method with the constraints given in Eqs. (2)–(4).

In generating rays from US, the rms vertical (or horizontal) source size $W_y$ (or $W_x$) and source divergence $\phi_y$ (or $\phi_x$) for the fundamental central cone radiation of λ are approximated by[12]

$$W_{y,x} = [\sigma_{y,x}^2 + \lambda L_u/(4\pi)^2]^{1/2}, \quad \phi_{y,x} = [\sigma'^2_{y,x} + \lambda/L_u]^{1/2}, \tag{13}$$

where $\sigma_y$ (or $\sigma_x$) and $\sigma'_y$ (or $\sigma'_x$) are the rms transverse size and rms angular divergence of the electron beam in the vertical (or horizontal) direction, respectively, and $L_u$ is the length of the undulator.

RESULTS

The design was made with the following parameter values. Scanning range: $\lambda_{min}$=0.5 nm, $\lambda_{max}$=10 nm. US: $\sigma_y$=0.013 mm, $\sigma_x$ =0.212 mm, $\sigma'_y$=3.076 μrad, $\sigma'_x$=18.889

μrad, $L_u$=4450 mm, H=4$W_x$=0.85 mm. M1: r=18 m, θ=88γ, R=155.7 m, dimensions =100(W)×3.6(H) mm² (for accepting the beam of $\lambda_{max}$ with a divergence of 4$\phi_{y,x}$). G: D=200 mm, 1/d=2400 grooves/mm, W=80 mm, L=5 mm, m=+1, $K_0$=88°, K ($\lambda_{min}$)=−88°, K($\lambda_{max}$) =−80.5°, blaze angle $\theta_B$=1.0°, M2: $D_0'$=400 mm, $\phi_0$=89°, $\phi(\lambda_{min})$=−89°, $\phi(\lambda_{max})$= −81.5γ, $\phi$−K=1°. $\lambda_i$=0.5, 2.5, 5.0, 7.5, 10.0 nm.

The value of θ is the result of a compromise between the size and R of M1 and the reflectance of gold coating. The value of K($\lambda_{min}$) was determined to have G=−89° at $\lambda_{min}$. The K($\lambda_{max}$), $\theta_B$, and $\phi(\lambda_{max})$ were optimized so as to improve the on-blaze feature and higher-order suppression. This was done by examining the grating efficiencies over the scanning range for $\theta_B$=0.5°, 1.0°, 1.5°, and 2.0° and gold coating, together with the reflectance of the gold coated M2. The groove efficiency and the reflectance were calculated by a scalar theory with the shadowing effect[13] and the Fresnel formulas, respectively. It should be mentioned that even when M1 has a manufacturing error of ~1.6 m in R, the resulting aberrations can be compensated simply by adjusting D by ~38 mm.

The design parameters thus determined are: 2a=1.762906×10⁻¹⁰ mm, 6b=5.299280×10⁻¹⁷ mm, 4c=1.354672×10⁻²³ mm, and $r_0'$=1647.78 mm. The wavelength-dependent design parameters are listed in Table III.

TABLE III

Values of the wavelength-dependent design parameters at several wavelengths.

| λ (nm) | K. (°) | α (°) | β (°) | φ (°) | D' (mm) | Δr' (mm) | D' + r' (mm) |
|---|---|---|---|---|---|---|---|
| 0.50 | 88.008615 | 88.997966 | −87.019264 | 89.008615 | 403.47 | −3.48 | 2048.78 |
| 1.50 | 86.525582 | 88.227606 | −84.823558 | 87.525582 | 161.82 | 238.54 | 2049.14 |
| 2.50 | 85.483011 | 87.666106 | −83.299916 | 86.483011 | 114.00 | 286.62 | 2049.40 |
| 3.75 | 84.420167 | 87.072808 | −81.767526 | 85.420167 | 87.69 | 313.18 | 2049.66 |
| 5.00 | 83.502217 | 86.541466 | −80.462968 | 84.502217 | 73.19 | 327.91 | 2049.88 |
| 6.25 | 82.674119 | 86.046071 | −79.302167 | 83.674119 | 63.74 | 337.57 | 2050.09 |
| 7.50 | 81.907831 | 85.573590 | −78.242072 | 82.907831 | 56.97 | 344.52 | 2050.28 |
| 8.75 | 81.186785 | 85.116442 | −77.257128 | 82.186785 | 51.83 | 349.85 | 2050.46 |
| 10.00 | 80.500226 | 84.669767 | −76.330685 | 81.500226 | 47.75 | 354.09 | 2050.63 |

EVALUATION OF THE ALS DESIGN

Figure 9:
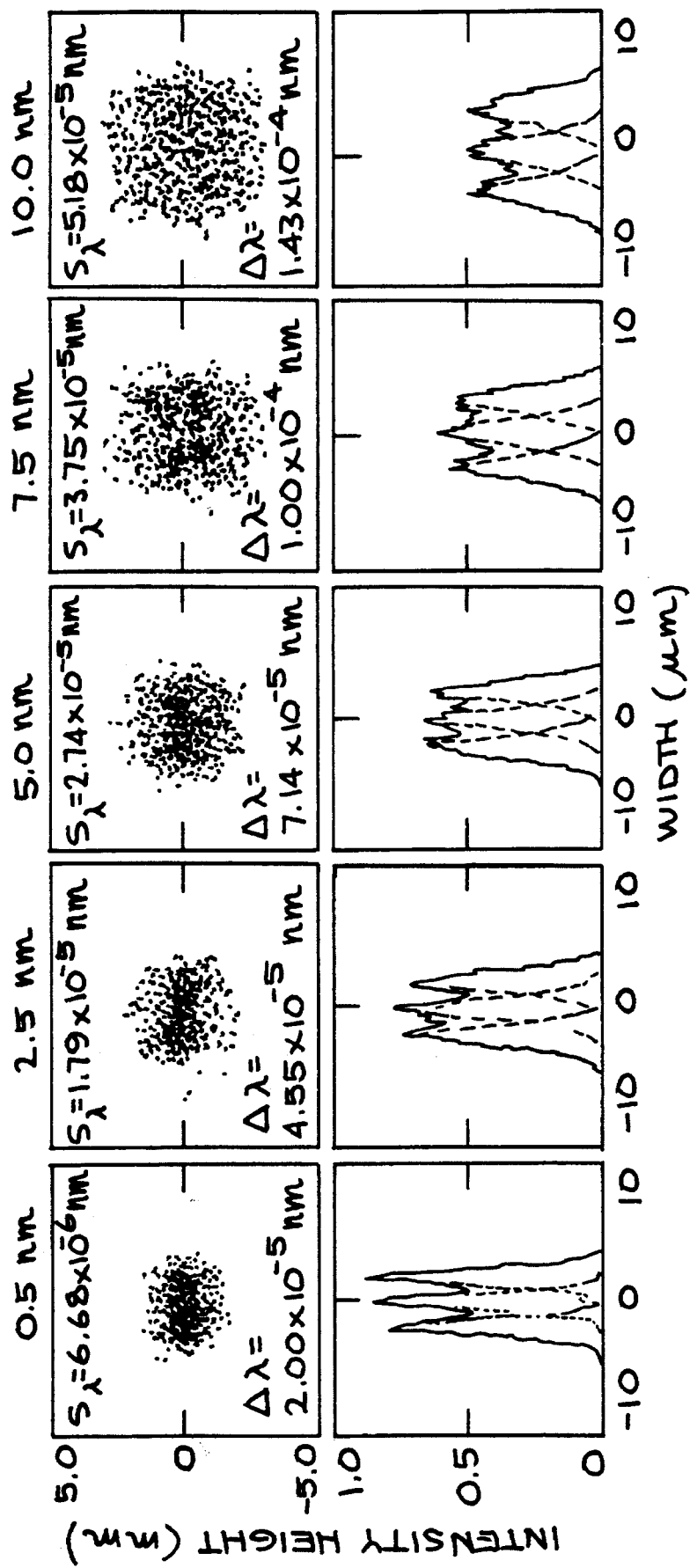

The performance of the monochromator thus designed was evaluated by means of ray tracing. FIG. 9 shows spot diagrams and line profiles. Each diagram is constructed with 3000 rays for individual wavelengths of λ and $\lambda_\pm$=λ±Δλ. These rays are generated randomly to simulate rays from the central cone of the US.[14] In each diagram are given the values of λ, Δλ, and the standard deviation $s_\lambda$ of the spectral spread for the rays of λ ($s_\lambda$ =product of the standard deviation $s_y$ of ray-traced spots in the direction of dispersion and the reciprocal linear dispersion at λ).

We assume that two similar spectrum lines of λ and λ+Δλ are resolved when their contours cross at the point of each whose height is 4/π² of the maximum (we call this point (4/π²)-maximum point on the analogy of half-maximum point). We use this definition to evaluate the resolving power, $\mathcal{R}$=λ/Δλ, of the present design for the following three cases. Case I: Δλ=the full width at the (4/π²)-maximum point of the line profile constructed from ray-traced spots. Case II: Δλ=2.688$s_{80}$, where $s_\lambda$ is assumed to represent the root-mean-square width of the effective Gaussian line profile. Case III (source-size limited case): Δλ=2.688$W_y$M[d cosβ/(D'+r')], M and the term in the brackets being the total lateral magnification in the vertical plane and the reciprocal linear dispersion at λ, respectively.

Figure 10:
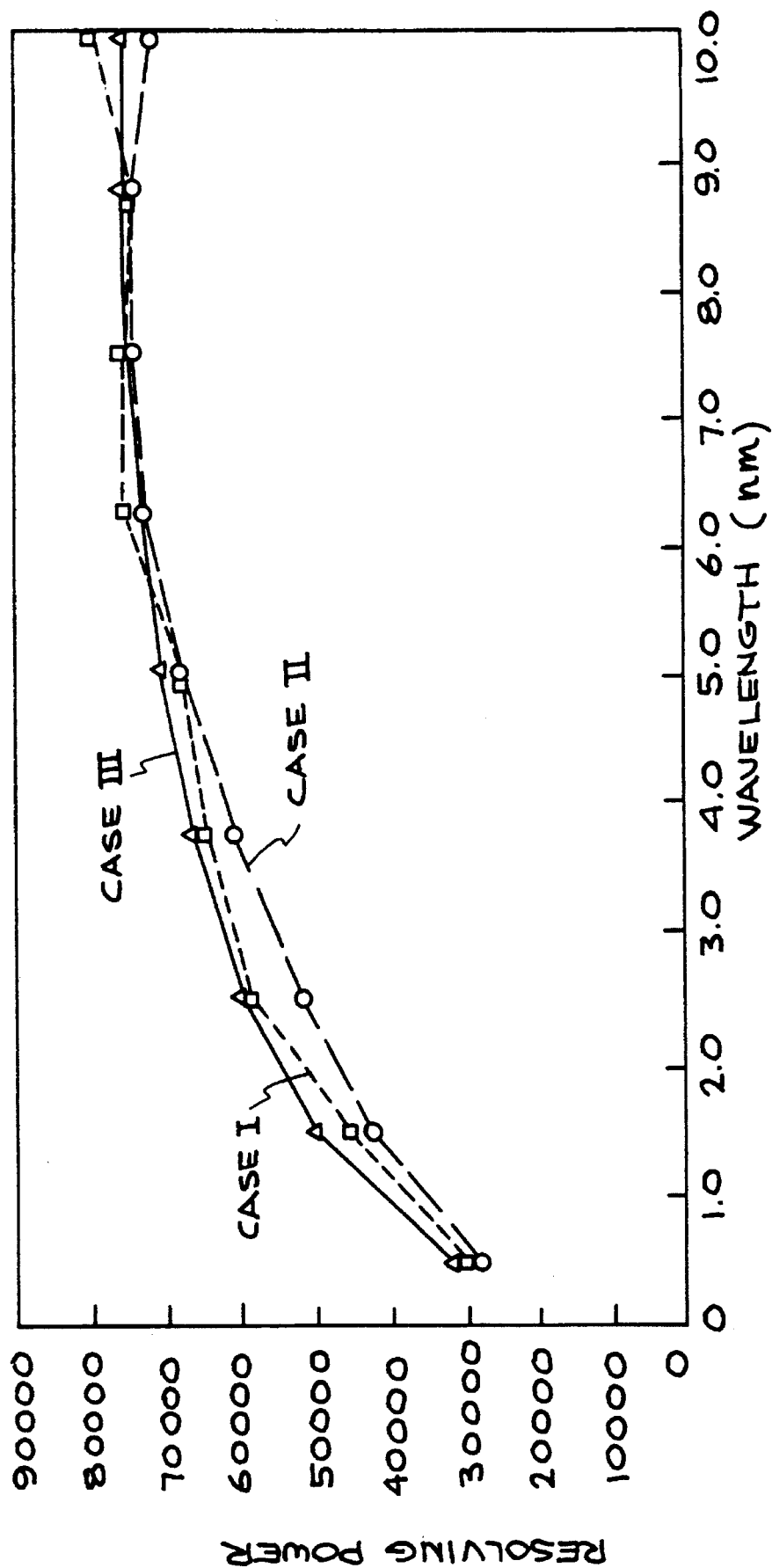

FIG. 10 shows the resolving power of the designed system estimated for the three cases, the curves I, II, and III being for Cases I, II, and III, respectively. The curves I and II deviate very little from the curve III at ~9 nm>λ>~5 nm, and the deviations are still small at other λ's. This implies that the designed monochromator provides a nearly source-size limited resolution.

Special precaution should be taken in using the Δλ of Case I when ray-traced spots yield a line profile with wings or a shoulder, such as the one often seen in an image having large coma. In such a case, the estimated resolving power may appear quite high, though the spectral purity is very poor (see also Ref. 10). By contrast, Case II takes into account the contribution of wings or a shoulder, so that it would provide a realistic resolving power. Therefore, it can be concluded from FIG. 10 that the hybrid design method is very effective and that the resulted monochromator would provide a resolving power of ~30000—70000 over the wavelength range of 0.5 nm–10 nm.

REFERENCES

"[1]H. Petersen, Opt. Commun. 40, 402 (1982)."

"[2]M. Domke, T. Mandel, A. Puschmann, C. Xue, D. A. Shirley, and G. Kaindl, Rev. Sci. Instrum. 63, 80 (1992)."

"[3]W. Jark, Rev. Sci. Instrum. 63, 1241 (1992)."

"[4]H. A. Padmore, Rev. Sci. Instrum. 60, 1608 (1989)."

"[5]R. Reininger and V. Saile, Nucl. Instr. and Meth. A288, 343 (1990)."

"[6]E. Erme, Rev. Sci. Instrum. 63, 1260 (1992)."

"[7]T. Harada, M. Itou, and T. Kita, Proc. SPIE 503, 114 (1984)."

"[8]M. Itou, T. Harada, and T. Kita, Appl. Opt. 28, 146 (1989)."

"[9]T. A. Callcott, W. L. O'Brien, J. J. Jia, Q. Y. Dong, D. L. Ederer, R. N. Watts, and D. R. Mueller, Nucl. Instr. and Meth. A 319, 128 (1992)."

"[10]M. Koike, R. Beguiristain, J. H. Underwood, and T. Namioka, in Nucl. Instr. and Meth. A, 347, 273–277."

"[11]M. Koike and T. Namioka, Appl. Opt. 33, 2048 (1994)."

"[12]K.-J. Kim, Nucl. Instr. and Meth. A 246, 67 (1986)."

"[13]A. P. Lukirskii and E. P. Savinov, Opt. Spectrosc. 14, 147 (1963)."

"[14]M. Koike, Book of Abstracts, 15th Int. Conf. on X-Rays and Inner-Shell Processes, Knoxville, 1990, paper B07."

Thus, the invention provides a novel diffraction grating that reduces aberrations resulting from the spherical mirror in monochrometers. The invention further corrects for changes in focal length for different wavelengths by translating and rotating a plane mirror in the optical path. A monochromator employing the inventive optical system increases resolution from a previously achieved value of 10,000 by a factor of 7 to resolution equal to 70,000.

The description of illustrative embodiments and best modes of the present invention are not intended to limit the scope of the invention. Various modifications, alternative constructions and equivalents may be employed without departing from the true spirit and scope of the appended claims.

Having thus described the invention, I claim:

1. A diffraction grating for use in a spectrometer comprising a reflecting surface having a plurality of substantially straight, parallel grooves of varying spacing from one another, wherein the ruling parameters $2a$, $6b$, and $4c$ are determined from the resolving power $\mathcal{R}$ or, equivalently, from the merit function O, for a specific optical configuration.

2. A diffraction grating for use in a spectrometer comprising a reflecting surface having a plurality of substantially straight, parallel grooves of varying spacing from one another, said groove spacing being approximately determined by a formula $d_n = d_0 + 2an + 6bn^2 + 4cn^3$, where $d_n$ is the approximate spacing between the nth groove and the (n+1) groove and the ruling parameters $2a$, $6b$, and $4c$ are determined from the resolving power $\mathcal{R}$ or, equivalently, from the merit function O, for a specific optical configuration.

3. The apparatus of claim 2 wherein the groove spacing is within about $-0.5\%$ and $+0.5\%$ of the values determined by the formula.

4. The apparatus of claim 2 wherein the groove spacing is within about $-0.2\%$ and $+0.2\%$ of the values determined by the formula.

5. The apparatus of claim 2 wherein the groove spacing is within about $-0.05\%$ and $+0.05\%$ of the values determined by the formula.

6. The apparatus of claim 2 wherein the ruling parameters are determined by maximizing the resolving power $\mathcal{R}$ or, equivalently, by minimizing the merit function O, for a specific optical configuration.

7. The apparatus of claim 6 wherein $\mathcal{R} = \lambda/\{2.68^{1/2}\}$.

8. A monochromator optical system comprising,
   a. a concave mirror for receiving and reflecting electromagnetic radiation from a source,
   b. a diffraction grating for receiving the electromagnetic radiation from the spherical mirror and reflecting a spectrum of said electromagnetic radiation, the diffraction grating comprising a reflecting surface having a plurality of substantially straight, parallel grooves of varying spacing from one another, wherein the ruling parameters $2a$, $6b$, and $4c$ are determined from the resolving power $\mathcal{R}$
   c. a plane mirror for receiving the spectrum from the diffraction grating and reflecting it to an exit port,
   d. means to connect a rotating means to the diffraction grating.

9. The apparatus of claim 8 further comprising
   a. means to connect a rotating means to the plane mirror;
   b. means to connect a translating means to the plane mirror.

10. The apparatus of claim 8 wherein the concave mirror is a spherical mirror.

11. The apparatus of claim 8 wherein a deviation angle, $2\phi$, between the plane grating and the concave mirror is between about 89.5° and about 70°.

12. The apparatus of claim 8 wherein an incident angle, $2\theta$, between the concave mirror and the electromagnetic radiation source is between about 89.5° and about 70°.

13. The apparatus of claim 8 wherein the concave mirror, diffraction grating, and plane mirror intercept the electromagnetic radiation in different sequence.

14. A monochromator optical system comprising,
   a. a concave mirror for receiving and reflecting electromagnetic radiation from a source,
   b. a plane mirror for receiving and reflecting the electromagnetic radiation from the spherical mirror,
   c. a diffraction grating for receiving the electromagnetic radiation from the plane mirror and reflecting a spectrum of said electromagnetic radiation to the exit port, the diffraction grating comprising a reflecting surface having a plurality of substantially straight, parallel grooves of varying spacing from one another, wherein the ruling parameters $2a$, $6b$, and $4c$ are determined from the resolving power $\mathcal{R}$, and
   d. means to connect a rotating means to the diffraction grating.

15. The apparatus of claim 14 further comprising
   a. means to connect a rotating means to the plane mirror;
   b. means to connect a translating means to the plane mirror.

16. A monochromator optical system comprising,
   a. a plane mirror for receiving and reflecting electromagnetic radiation from a source,
   b. a diffraction grating for receiving the electromagnetic radiation from the plane mirror and reflecting a spectrum of said electromagnetic radiation, the diffraction grating comprising a reflecting surface having a plurality of substantially straight, parallel grooves of varying spacing from one another, wherein the ruling parameters $2a$, $6b$, and $4c$ are determined from the resolving power $\mathcal{R}$,
   c. a plane mirror for receiving the spectrum from the diffraction grating and reflecting it to an exit port, and
   d. means to connect a rotating means to the diffraction grating.

17. The apparatus of claim 16 further comprising
   a. means to connect a rotating means to the plane mirror;
   b. means to connect a translating means to the plane mirror.

18. A monochromator optical system comprising,
   a. a diffraction grating for receiving electromagnetic radiation from a source and reflecting a spectrum of said electromagnetic radiation, the diffraction grating comprising a reflecting surface having a plurality of substantially straight, parallel grooves of varying spacing from one another, wherein the ruling parameters $2a$, $6b$, and $4c$ are determined from the resolving power $\mathcal{R}$,
   b. a plane mirror for receiving and reflecting the spectrum from the diffraction grating,
   c. a spherical mirror for receiving the spectrum from the plane mirror and reflecting it to an exit port, and
   d. means to connect a rotating means to the diffraction grating.

19. The apparatus of claim 18 further comprising
   a. means to connect a rotating means to the plane mirror;
   b. means to connect a translating means to the plane mirror.

* * * * *